United States Patent
Young, Jr.

[15] 3,683,474
[45] Aug. 15, 1972

[54] METHOD FOR FABRICATING A SELF-ALIGNING BEARING

[72] Inventor: Roy W. Young, Jr., 4749 Rosebank Drive, La Canada, Calif. 91011

[22] Filed: March 23, 1970

[21] Appl. No.: 24,929

Related U.S. Application Data

[60] Division of Ser. No. 654,295, June 13, 1967, Pat. No. 3,506,315, which is a continuation-in-part of Ser. No. 599,241, June 21, 1966, abandoned.

[52] U.S. Cl. ................................. 29/149.5 B
[51] Int. Cl. ..................... B23p 11/00, B21d 53/10
[58] Field of Search .......... 29/149.5 B, 149.5 P, 441; 308/72

[56] References Cited

UNITED STATES PATENTS

| | | |
|---|---|---|
| 3,452,415 | 7/1969 | Beazley et al. ........ 29/149.5 B |
| 1,261,154 | 4/1918 | Newman .................. 308/196 |
| 1,374,988 | 4/1921 | Cooper .................... 308/196 |
| 2,906,569 | 9/1959 | Runton et al. .............. 308/72 |
| 3,243,212 | 3/1966 | May ........................... 308/72 |
| 2,475,393 | 7/1949 | Keahey ..................... 308/72 |
| 3,362,761 | 1/1968 | Zachariassen ........... 308/196 |
| 2,366,668 | 1/1945 | Heim ......................... 308/72 |
| 3,208,804 | 9/1965 | Stenert et al. ............ 308/236 |

*Primary Examiner*—Thomas H. Eager
*Attorney*—Christie, Parker & Hale

[57] ABSTRACT

A self-aligning bearing is assembled by placing two race elements having spherically curved, concave race surfaces over the complementary spherical bearing surface of a bearing member with the races in bearing relationship with the bearing surface of the bearing member. A retaining member is then bonded to the outer cylindrical surfaces of the race elements throughout the interface between the retaining member and the elements.

11 Claims, 7 Drawing Figures

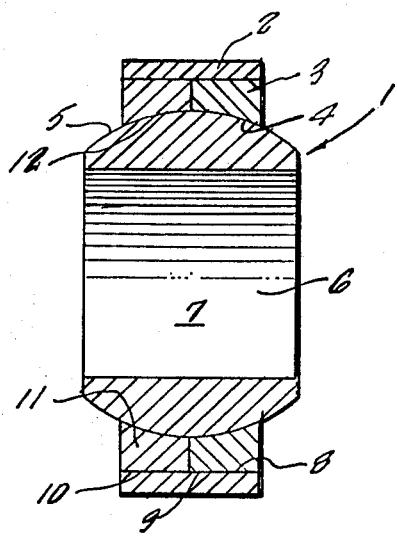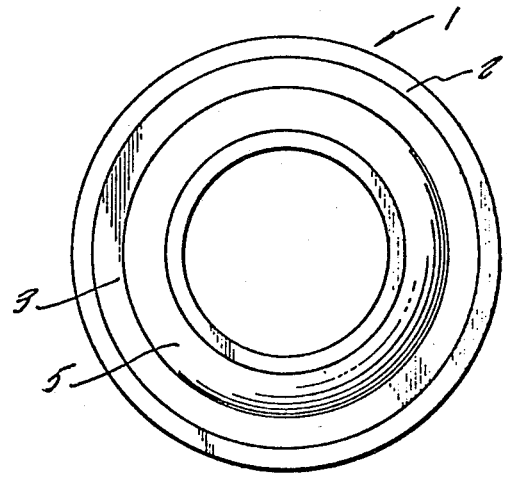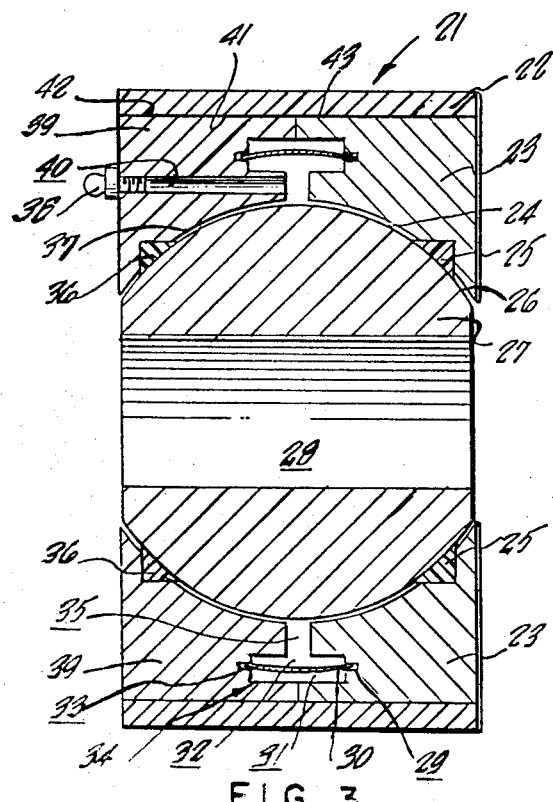
FIG.1
FIG.2
FIG.3
FIG.4

METHOD FOR FABRICATING A SELF-ALIGNING BEARING

CROSS REFERENCE TO RELATED APPLICATION

This is a division of application Ser. No. 654,295, filed June 13, 1967, now U.S. Pat. No. 3,506,315, granted Apr. 14, 1970, which, in turn, is a continuation-in-part application of application Ser. No. 559,241, filed on June 21, 1966, now abandoned.

BACKGROUND OF THE INVENTION

This invention relates to the art of fabricating self-aligning bearings of the type employing a unitary, spherically surfaced bearing member held in place by two bearing race elements and an outer retaining member.

Self-aligning, spherical bearings presently known include bearings having a unitary outer race member as well as bearings having two-piece outer race members which are normally held in place by a swaged member or ring. The sphericity of the bearing surfaces is extremely important in serving the bearing's function because proper bearing action with various element orientations would otherwise be impossible. Unfortunately, the nature of prior art bearings denies the achievement of truly spherical bearing surfaces primarily because of the manner by which they are fabricated.

Bearings having a unitary outer race member are generally fabricated by placing a spherically surfaced, inner bearing member into a deformed socket in the outer race member. The outer race is then swaged or otherwise deformed around the inner bearing member. This deformation process requires the use of the inner, spherical bearing member as a forming piece. So used, the inner bearing may be structurally damaged and made aspherical. The race member's sphericity is also destroyed. The swaging process requires the use of a structurally weak, malleable material for the outer race member. The asphericity produced by the swaging process results in galling of the bearing surfaces as the bearing is used which produces poor lubrication performance if wet film lubricants are used. This is because galling creates disrupted surfaces in metal-to-metal contact which do not receive lubrication from the oil or grease lubricant employed. The application of a solid composition type lubricant, lubricating plastics, or dry film lubricants is impossible because the swaging process used to deform the outer race member around the inner bearing member destroys these lubricants either directly or by galling.

One bearing having a unitary outer race which avoids many of these problems is known as the Messerschmitt bearing. With this bearing no swaging or other deformation process is necessary. A flat on either side of the spherical, inner bearing member allows the member to be inserted into a preformed outer race by inserting the inner member into the outer race at 90° to its in-place orientation. The inner member is then rotated 90° to lock it in place. Alternately, slots in the outer race may be used to receive the spherical inner bearing member which is then rotated 90° to its in-use position. The Messerschmitt bearing, however, suffers because it requires an interrupted bearing surface either in the inner member or the outer race member.

The self-aligning spherical bearings having a two-element outer race assembly are, similarly, fabricated by the swaging process and as a consequence all the attendant problems previously mentioned are present. One type of a two-element outer race bearing employs a retaining ring or collar which is mounted around the race elements and swaged at its ends to provide a lock. The strength of the bearing in resistance to axial loading is thus dependent upon the strength of the annular flange formed by the swaging process. The bearing can fail if the flange deforms sufficiently to allow the displacement of one of the outer race elements or if the flange fails entirely.

An increase in the structural integrity of a self-aligning bearing with a two-element race assembly has been produced by forming the outer surfaces of the race elements frusto-conical. Each of the race elements is swaged into a retaining ring or collar such that the base of the frusto-conical section is disposed at the radial center line of the finished bearing assembly thus producing an inverted, V-shaped, discontinuous line along the radial periphery of the race elements. This type of construction locks the race elements into place but is costly and suffers because of the requirement for swaging. In addition, the outer retaining element must be malleable which compromises the strength of the assembled bearing.

In short, the prior art self-aligning bearings of a spherical type have suffered because of the difficulty in obtaining a truly spherical bearing relationship between the outer race element and the inner spherical bearing member. In addition, the structural integrity of the previous bearings has been compromised because of the requirement for a malleable material used when swaging is dictated. Moreover, the Messerschmitt type bearing, while structurally sound, suffers because of discontinuous bearing surfaces. Further, many of the bearings, as in those requiring swaging in their fabrication, are not readily adapted to sound lubricating techniques.

SUMMARY OF THE INVENTION

The present invention provides a method for fabricating a self-aligning bearing.

Before summarizing the method of the present invention it is constructive to consider the self-aligning bearing made by the process. The bearing includes a bearing member having a convex spherical bearing surface and an axial bore. The convex spherical surface of the bearing member is described as that portion of a sphere between two nonintersecting planes with each plane located on an opposite side of the sphere's equator. A pair of bearing race elements are disposed in bearing cooperation around the bearing member's spherical bearing surface. Each of the bearing race elements has a cylindrical outer surface and an inner race defined by that portion of the sphere between an imaginary plane containing its great circle and a plane spaced from the great circle plane. The outer cylindrical surfaces of the bearing race elements are, within normal machining tolerances, of equal diameter. The bearing race elements complement each other to retain the bearing member and to define an inner race which cooperates with the spherical bearing's surface of the bearing member to provide bearing action. A bonding or retaining member is disposed about the cylindrical surfaces of the race element to secure the race elements in place and to provide the structural integrity of the bearing assembly. The structural integrity is accomplished by securing or bonding the cylindrical surfaces of the race elements to the inner surface of the retaining member at the interface between the two. The bond at the interface is sufficient to hold the bearing elements together. Inasmuch as the structural integrity of the bearing assembly depends upon the degree of bonding between the retaining member and the race elements, a strong bond and a large bonding interface is preferred. Preferably, the bond is provided by diffusion bonding the retaining member to the bearing race elements at their outer cylindrical surfaces.

A presently preferred method for assembling or forming the self-aligning bearing of the instant invention contemplates the placing of the race elements around the bearing member in bearing relationship therewith. Such a bearing relationship may be achieved by having the inner race portion of each of the elements meet at the great circle of a sphere which defines the race surfaces. After the race elements are assembled, they are secured to a retaining member such that the outer cylindrical surfaces of the race elements meet the inner cylindrical surface of the retaining member to define an interface. Preferably, the retaining member is secured to the race elements by diffusion bonding, which has the effect of eliminating the interface and forming an integral unit composed of the race elements and the retaining member.

The advantages of the instant invention include the provision of a self-aligning bearing having truly spherical bearing surfaces. These spherical bearing surfaces are the result of the elimination of the swaging process. Because of the sphericity, galling and lubricant failure are overcome. In addition, by retaining the race elements by a retaining member disposed about the outer cylindrical surfaces of such elements, the structural integrity of the bearing is substantially enhanced over those types of bearings requiring swaging. The bearing of the instant invention can be fabricated from any desirable material and is not limited to the use of a malleable or deformable material which was required in those types of bearings which had to be swaged. Because of the sphericity of the bearing surfaces, lubrication without failure of the bearing surfaces is readily accomplished. Moreover, through eliminating swaging, solid lubricant liners can be used which were heretofore limited because the swaging step often fractured such materials. In addition, the instant invention has continuous spherical bearing surfaces which were absent in the Messerschmitt type bearing. Further, because of the elimination of the swaging step required in many of the prior art bearings, dry film lubricant coatings can be placed on the bearing surfaces prior to assembly of the bearing. This prior coating eliminates surface irregularities heretofore attendant in the lubrication of assembled bearings.

These and other features, aspects and advantages of the instant invention will become more apparent from the following description, appended claims and drawings.

BRIEF DESCRIPTION OF THE FIGURES

FIG. 1 is a half-sectional view of one embodiment of the instant invention;

FIG. 2 is an end view of the embodiment shown in FIG. 1;

FIG. 3 is a half-sectional view of another embodiment of the invention;

FIG. 4 is a half-sectional view of still another embodiment of the invention;

DESCRIPTION OF THE PREFERRED EMBODIMENTS

Figure 5:
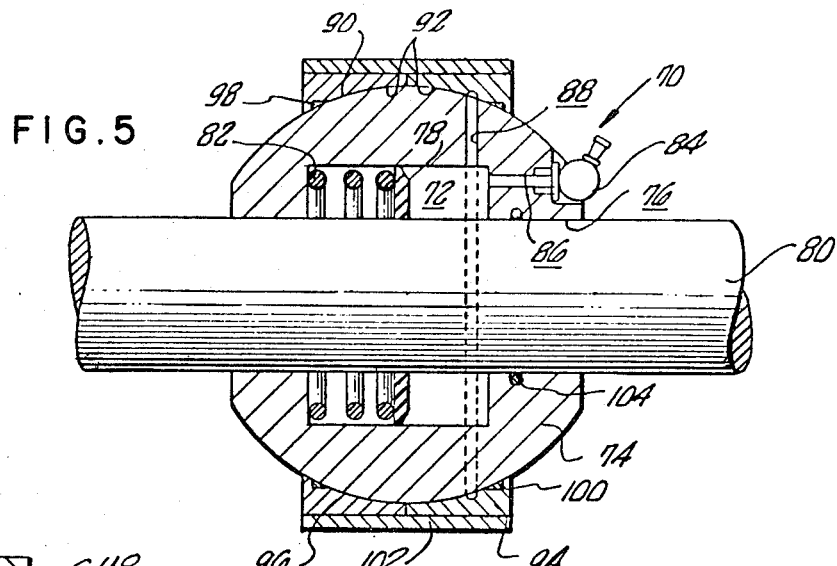
FIG. 5 is a half-sectional view of still another embodiment of the invention.

FIGS. 1 and 2 depict one embodiment of the improved self-aligning bearing of the instant invention which is shown, in general, by reference numeral 1. Bearing member 6 has an axial bore 7 and a spherical bearing surface 5. The spherical bearing surface 5 is defined by that portion of a sphere between two parallel planes, the planes being disposed on opposite sides of a plane containing a great circle or equator of the sphere. Race elements 3 and 11 are mounted around and in bearing relationship to bearing member 6. Race element 3 is generally toroidal in configuration and has a cylindrical outer surface 9 which is parallel to the longitudinal axis of race element 3. The inner surface or race 4 of race element 3 is disposed in bearing relationship with spherical surface 5 of bearing member 6. Inner surface 4 has a spherical configuration defined by that portion of a sphere between its equator and a plane parallel to the equator. Similarly, race element 11 is generally toroidal in configuration and has a cylindrical outer surface 10 which, within ordinary machining tolerances, is equal in diameter to surface 9 of race element 3. The bearing surface or inner race 12 of element 11, as in its complementary race 4, is described by a spherical surface bounded by the equator of a sphere and a plane parallel thereto. Thus races 4 and 12 of race elements 3 and 11 form a unitary concave spherical race in an assembled condition. Retaining member 2, in the form of a cylindrical ring, is disposed about the outer cylindrical surfaces 9 and 10 of race elements 3 and 11, respectively. The inner cylindrical surfaces 8 of retaining member 2 is bonded to the outer cylindrical surfaces 9 and 10 to provide substantial resistance to axial stress acting along the interface defined by these surfaces. The bonding processes will be described in detail subsequently. Normal bearing clearance is contemplated between races 4 and 12 and spherical surface 5.

Referring to FIG. 3 an alternate embodiment of the instant invention is shown by reference numeral 21. This embodiment provides means for introducing a wet lubricant to the bearing surfaces of the race elements and the inner bearing member. As in the previously described embodiment, outer retaining member 22, in the form of a cylindrical ring, is disposed about race elements 23 and 39. The inner surface 41 of retaining member 22 and the outer cylindrical surfaces 42 and 43 of race members 39 and 23, respectively, define an interface which is bonded in such a manner as to provide structural integrity for the bearing 21. The inner bearing surfaces 24 and 37 of race elements 23 and 39, respectively, have a spherical configuration as in the previously described embodiment. Similarly, bearing member 27 with its spherical bearing surface 26 is retained between race elements 23 and 39 and in bearing cooperation therewith. Bearing member 27 has an axial bore 28 for receiving a shaft (not shown).

The forced feed lubrication system of bearing 21 generally comprises a lubricant reservoir 34 which is in lubricant communication with the bearing surfaces or races 37 and 24 of race members 39 and 23 as well as spherical surface 26 of bearing member 27. This lubricant communication is provided through an annular duct 35. However, duct 35 could be replaced by a series of ports in communication with reservoir 34 and the bearing surfaces. Reservoir 34 has a lubricant storage chamber 32 bounded by diaphragm 30. Diaphragm 30 is annularly disposed and retained in seats 29 and 33 of race elements 23 and 39, respectively. Diaphragm 30 is of an elastic material which tends to deform inwardly towards bearing member 27 to provide a constantly acting force on a lubricant stored within the chamber 32 and duct 35. If desired, this inward force could be produced by springs disposed on the outside of diaphragm 30 and retained within chamber 31. Chamber 31 is provided to accommodate outward deflection of diaphragm 30 when chamber 32 is initially filled with a lubricant. Lubricant replacement is readily accomplished by introducing a lubricant by means of fitting 38 through passage 40 into chamber 32 of reservoir 34.

Annular seals 36 and 25 are provided in order to retain a lubricant film on the bearing surface 26 of bearing member 27 and races 24 and 37 of race elements 23 and 39. Annular seal 25 is held in race element 23 for contact with surface 26 of spherical bearing 27. In like manner, seal 36 is held in place by race element 39 and bears against surface 26 of bearing member 27. These seals may be formed of any known sealing material such as a material sold under the trademark TEFLON: a polytetrafluorethylene having good sealing and lubricant characteristics. Thus, when bearing element 27 rotates with respect to races 24 and 37 about a transverse point, the lubricant will be retained between seals 25 and 36. This eliminates the possibility that one of the bearing surfaces will be wiped clean of lubricant as bearing element 27 is rotated or displaced about a point normal to its longitudinal axis. Further, wet film lubricating embodiments are shown in FIGS. 5 through 7 and will be presently discussed.

A self-aligning bearing 51 of the invention which employs a solid lubricant liner is shown in FIG. 4. As in the previously described embodiments, retaining member 52 secures bearing race elements 53 and 59 in bearing relation to spherical bearing member 58 having an axial bore 57. A two-piece solid lubricant material 54, for example a Teflon liner, is retained in annular channel 61 of race element 53 and annular channel 60 of race element 59. The bearing surfaces are then defined by the spherical surface 56 of bearing member 58 and the inner spherical surface 55 of liner 54. The channels 61 and 60 as well as the liner 54 cooperate to define a spherical race surface 55 for the liner 54. The solid lubricant material may be of any of a well known variety of materials. Composition lubricants having a graphite base, for example, may be used with excellent results.

The solid lubricant liner 54, as was previously mentioned, may by any one of a number of known solid lubricant materials. Any of these solid lubricating materials may be placed and bonded within channels 60 and 61 of race elements 59 and 53 before the assembly of the race elements and the subsequent securing of the retaining member 52. Because the assembly procedure of the instant invention requires no swaging, a substantially perfect lubricant relationship between liner 54 and surface 56 of bearing member 58 can be achieved without damage to the liner. The structural backing provided by the race elements 52 and 59 allows solid lubricant coatings to be applied directly to the surface 56 of bearing member 58. In any event, the solid lubricant liner 54 or a coating of such material on surface 56, or both, may be bonded to their parent bodies by any of a number of well known techniques.

Figure 6:
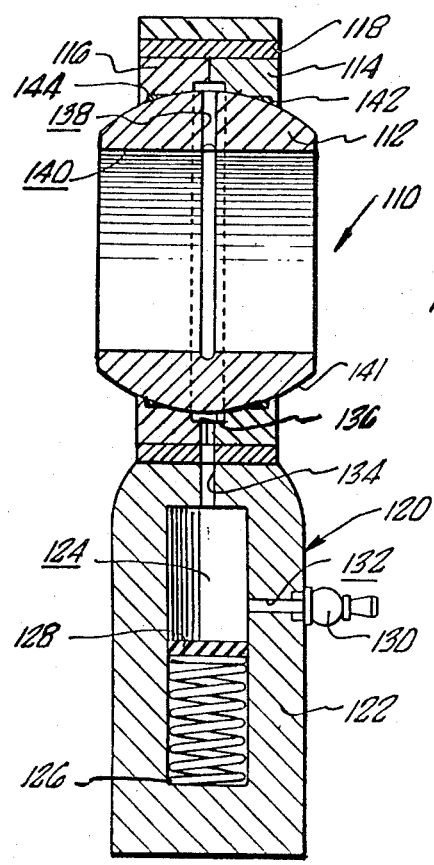
FIG. 6 is a half-sectional view of a rod-end bearing employing the principle of this invention.
Figure 7:
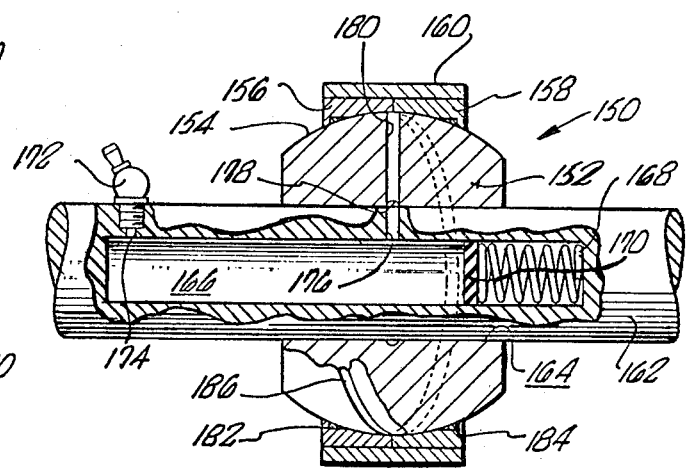
FIG. 7 is a half-sectional view of a further embodiment of the invention.

FIGS. 5 through 7 illustrate alternate embodiments of the wet film lubricant supply reservoirs of the present invention.

A self-aligning bearing 70 which employs an internal reservoir within its bearing member is shown in FIG. 5. A reservoir 72 is provided within spherical bearing member 74 coaxial with the bearing member's bore 76. The reservoir is in the form of an annular enlarged chamber formed intermediate bore 76. An annular sealing member 78 is disposed within reservoir 72 and around a shaft 80 which is received in bore 76. Spring 82 occupies a biasing portion of reservoir 72 and bears against one of its vertical walls to bias sealing member 78 towards the right. Grease fitting 84 is mounted in bearing member 74 and is communicated with reservoir 72 through a duct 86. A duct 88 communicates reservoir 72 with spherical bearing surface 90 of bearing member 74 and bearing surfaces or race 92 of race elements 94 and 96. Lubricant charged into reservoir 72 under pressure compresses spring 82 which stores energy to continuously pressurize the lubricant. The pressurized lubricant in reservoir 72 acts through duct 88 to provide lubricant to the bearing interface defined between surface 90 and race 92. A pair of annular seals 98 and 100 are disposed within race elements 96 and 94, respectively, to retain lubricant within the interface. A retaining member 102 is disposed about the outer cylindrical surfaces of race elements 94 and 96 to hold bearing 70 together in the manner to be described in greater detail subsequently. O-ring 104 is disposed within bearing member 74 to cooperate with shaft 80 in preventing lubricant escape through bore 76 from reservoir 72. Sealing member 78 prevents lubricant loss past spring 82.

FIG. 6 depicts another application of the unique wet film lubricating facility of the present invention. Rod-end bearing assembly 110 includes a bearing member 112 held in place by a pair of races 114 and 116 as well as a retaining member 118 in the manner previously alluded to and which is described in some detail later. Support member 120 is annularly disposed about retaining member 118 and extends laterally as a shank 122. If desired, retaining member 118 may be dispensed with and the races held in place by support member 120 in the same manner. A reservoir 124 is included within shank 122 and houses a spring 126. Spring 126 urges against sealing member or piston 128 and the bottom wall of the reservoir. A grease fitting 130 is communicated through a duct 132 with reservoir 124. Lubricant communication with the bearing surfaces of rod-end bearing 110 are provided through a duct 134 which extends upwardly from reservoir 124 through retaining member 118, between races 114 and 116 to an annular channel 136. Annular channel 136 is circumferentially disposed about the race surface of race elements 114 and 116. A duct or passage 138 extends from channel 136 into bore 140 of bearing member 112. Seals 142 and 144 are provided in race elements 114 and 116 to maintain lubricant at the interface between bearing member 112 and the races. Lubricant is charged through fitting 130 under high pressure into reservoir 124 and compresses spring 126. Spring 126 maintains a biasing pressure on lubricant within reservoir 124 to provide a constant supply of lubricant to the bearing surfaces of the rod-end bearing.

FIG. 7 illustrates still another embodiment of the wet film lubricating structure of the present invention. Self-aligning bearing assembly 150 includes a bearing member 152 having a spherical bearing surface 154. Race elements 156 and 158 are annularly disposed about bearing member 152 and are retained in place by retaining member 160 in a manner to be described. A shaft 162 extends through bore 164 of bearing member 152. Lubricant reservoir 166 is disposed within shaft 162 and includes spring 168 and piston 170. For installation of these elements, the shaft may be formed in two parts. A grease fitting 172 is in lubricant communication with reservoir 166 through a duct 174. A duct 176 extends from reservoir 166 to an annular groove 178 in bearing member 152. Annular groove 178 extends around the inner surface of bore 164 to provide lubrication between the bore and shaft 162. A duct 180, in turn, communicates annular groove 178 with the bearing interface between race elements 156 and 158 and bearing surface 154 of bearing member 152. Seals 182 and 184 are annularly disposed about and in contact with bearing surface 154 of bearing member 152. An annular groove 186 is in the surface of bearing member 152 and extends completely around this surface at a slight angle to a plane normal to the axis of bearing member 152. Lubricant is charged through fitting 172 into reservoir 176 to compress spring 168 which in turn exerts a biasing pressure on lubricant within the reservoir. This biasing pressure is felt through duct 176, annular groove 178, duct 180 and annular, canted groove 186 to provide constant film lubrication to the various bearing surfaces.

The manner of bonding the retaining member to the race elements to provide the structural integrity of the self-aligning bearing of this invention will now be described.

Diffusion bonding is the preferred technique for securing the retaining member around the outer cylindrical surfaces of the race elements. Diffusion bonding is a known process which creates an intermolecular or atomic bond between two materials being joined. This bond is produced by the diffusion of one material into another. The diffusion rate between two materials is a function of temperature, pressure and the type of material to be joined. Obviously, different diffused materials create different joint strengths. Often it is desirable to use the diffusion between two dissimilar materials which have been previously deposited on the bodies to be joined. A complete diffusion bond will substantially elminate the traces of an interface between two materials being joined. Thus, in the instant application, the interface between the retaining member and the cylindrical outer surfaces of the race elements disappears creating an integral structure including both race elements and the retaining member.

The preferred diffusion bonding process applicable to the self-aligning bearing of the instant invention is as follows: The retaining member is made slightly undersized relative to the outer cylindrical surfaces of the race elements. The member is then heated sufficiently to allow its placement over the race elements. Cooling of the retaining member will then create a pressure acting normal to the interface between the member and the cylindrical surfaces of the race elements. The assembled bearing is then treated at an elevated temperature to accomplish the diffusion bond. This elevated temperature increases the diffusion rate and facilitates local plastic flow to increase the area of contact between the joined surfaces. Treated for a sufficient period at the elevated temperature the interface between the retaining member and the race elements will completely disappear. In many applications it may be desirable to use intermediate materials to form a film on the surfaces to be joined inasmuch as foreign atoms or molecules often diffuse more rapidly than parent material. The choice depends on the desired strength between the materials being joined. Diffusion bonding with intermediate materials also has the advantage of preventing the formation of inter-metallic compounds of the parent or base materials which might be brittle.

In many applications, sufficient strength at the interface between the retaining member and the race elements can be achieved through a shrink fit. A shrink fit is readily accomplished by heating the retaining member sufficiently to allow its placement over the race elements. The retaining member is then allowed to cool and contract about the race elements. This procedure creates a hoop stress in the retaining member and, in turn, a substantial force acting normal to the cylindrical surfaces of the race elements; this force creates a frictional bond.

In some applications the use of an adhesive material applied to the surfaces which form the interface between the retaining member and the race elements may be used in conjunction with other securing or bonding techniques. An example of a class of adhesives which can be used is thermal-setting plastics. As is well known, these plastics are set by the application of heat.

Another method of joining the retaining member to the race elements uses a eutectic or low melting material such as tin or solder. These materials are previously applied to the inner cylindrical surface of the retaining member and the outer cylindrical surfaces of the race elements. The retaining member is then expanded at a temperature below the melting point of the bonding material and placed around the race elements. The retaining member is allowed to cool and contract about the race elements. Subsequent heating at the melting point of the eutectic or low melting material creates a bond augmented by the shrink fit of the retaining member around the race members. Other processes for joining the retaining member to the race elements include spot welding.

The instant invention has been described with reference to certain preferred embodiments. The scope and spirit of the appended claims should not, however, necessarily be limited to the foregoing description.

What is claimed is:

1. A method of forming a self-aligning bearing having a bearing member with a convex spherical bearing surface, a pair of bearing race elements each having a cylindrical outer surface of the same diameter as the other, each of the race elements including an inner race portion defined by the surface of a sphere between an imaginary plane containing a great circle of such sphere and an imaginary plane spaced from such great circle, and a retaining member with a cylindrical inner surface, the method comprising the steps of:

placing the race elements around the bearing member such that the inner race portion of each of such elements meet the great circle of a sphere defining the race portions, and then securing the retaining member to the outer cylindrical surfaces of the race elements at the interface between the retaining member and the cylindrical outer surfaces of the race elements.

2. The method of forming a self-aligning bearing claimed in claim 1 including the additional step of coating the spherical bearing surface of the bearing member with a dry film lubricant before the placing step.

3. The method of forming a self-aligning bearing claimed in claim 1 including the additional step of coating the race portion of the race elements with a dry film lubricant before the placing step.

4. A method of forming a self-aligning bearing comprising the steps of:

a. placing a pair of race elements over a convex, spherically curved bearing surface of a bearing member with a concave, spherically curved race surface of each of the race elements next to the bearing surface of the bearing member, the radius of curvature of the bearing surface and the race surfaces being essentially equal;

b. placing a retaining member having a right cylindrical inner surface over complementary right cylindrical surfaces of the race elements; and then c. bonding the retaining member to the race elements at the interface between the race elements and the retaining member along the circumferential extent of such interface without plastically deforming the retaining member or the race elements and such that the race surfaces and bearing surface are in substantially completely uniform bearing relationship with each other.

5. The method of forming a self-aligning bearing claimed in claim 4 wherein the bonding step is effected by diffusion bonding the race elements to the retaining member.

6. The method of forming a self-aligning bearing claimed in claim 5 wherein the retaining member's inner cylindrical surface is slightly smaller in diameter in an unstressed condition than the outer cylindrical surfaces of the race elements and the diffusion bond is produced by the steps of:

a. heating the retaining member sufficiently to allow its placement over the outer cylindrical surfaces of the race elements; and then b. placing the so-heated retaining member around the cylindrical outer surfaces of the race elements; and then c. cooling the retaining member to produce a shrink fit between the retaining member and the race elements to produce an assembled bearing; and then d. placing the assembled bearing in an elevated temperature environment for a time sufficient to produce a diffusion bond between the race elements and the retaining member.

7. The method of forming a self-aligning bearing claimed in claim 4 wherein the bonding step includes bonding the outer cylindrical surfaces of the race elements to the retaining members with a eutectic material.

8. The method of forming a self-aligning bearing claimed in claim 4 wherein the bonding step includes shrink fitting the retaining member around the outer cylindrical surfaces of the race elements.

9. The method of forming a self-aligning bearing claimed in claim 4 wherein the bonding step includes welding the retaining member to the outer cylindrical surfaces of the race elements.

10. The method of forming a self-aligning bearing claimed in claim 4 including the additional step of coating the spherical bearing surface of the bearing member with a dry film lubricant before the placing step.

11. The method of forming a self-aligning bearing claimed in claim 4 including the additional step of coating the race portion of the race elements with a dry film lubricant before the placing step.

* * * * *